US012769272B2

(12) United States Patent
Leufke et al.

(10) Patent No.: US 12,769,272 B2
(45) Date of Patent: Oct. 20, 2026

(54) METHOD FOR PREDICTING THE COMPATIBILITY OF ASSEMBLIES FOR A FUNCTIONAL UNIT OF A FIELD DEVICE

(71) Applicant: Endress+Hauser SE+Co. KG, Maulburg (DE)

(72) Inventors: Philipp Leufke, Rheinfelden (DE); Patrick Werner, Steinen (DE); Jawad Tayyub, Maulburg (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 287 days.

(21) Appl. No.: 18/721,704

(22) PCT Filed: Dec. 1, 2022

(86) PCT No.: PCT/EP2022/084086

§ 371 (c)(1),
(2) Date: Jun. 19, 2024

(87) PCT Pub. No.: WO2023/117365

PCT Pub. Date: Jun. 29, 2023

(65) Prior Publication Data

US 2025/0060720 A1 Feb. 20, 2025

(30) Foreign Application Priority Data

Dec. 23, 2021 (DE) ..................... 10 2021 134 611.8

(51) Int. Cl.
*G05B 19/042* (2006.01)
*G01D 3/08* (2006.01)

(52) U.S. Cl.
CPC ........... *G05B 19/0425* (2013.01); *G01D 3/08* (2013.01)

(58) Field of Classification Search
CPC .............................. G05B 19/0425; G01D 3/08
USPC ........................................................... 700/79
See application file for complete search history.

(56) References Cited

U.S. PATENT DOCUMENTS

| | | | | |
|---|---|---|---|---|
| 2011/0215924 | A1* | 9/2011 | Kolblin | G05B 19/0428 340/540 |
| 2013/0257627 | A1* | 10/2013 | Rafael | G05B 19/042 340/691.6 |
| 2016/0246294 | A1* | 8/2016 | Girardey | G05B 19/41845 |
| 2018/0067475 | A1 | 3/2018 | Jacobs, II | |
| 2021/0165382 | A1* | 6/2021 | Mayer | G05B 19/0425 |

FOREIGN PATENT DOCUMENTS

| | | | |
|---|---|---|---|
| DE | 102008030315 | A1 | 12/2009 |
| DE | 102019121913 | A1 | 2/2021 |
| EP | 3855259 | A1 | 7/2021 |

* cited by examiner

*Primary Examiner* — Md Azad
(74) *Attorney, Agent, or Firm* — Kelly J. Smith; Endress+Hauser (USA) Holding, Inc.

(57) ABSTRACT

The present disclosure relates to an automated method for predicting compatibility of assemblies for a functional unit of a field device of automation technology. With targeting, those combinations of assemblies are selected, which in combination lead to a functional unit, which can be described by functional parameters, wherein the functional parameters lie within a predetermined value range as a function of the particular application of the field device.

8 Claims, 1 Drawing Sheet

METHOD FOR PREDICTING THE COMPATIBILITY OF ASSEMBLIES FOR A FUNCTIONAL UNIT OF A FIELD DEVICE

CROSS-REFERENCE TO RELATED APPLICATIONS

The present application is related to and claims the priority benefit of DPMA Patent Application No. 10 2021 134 611.8, filed Dec. 23, 2021, and International Patent Application No. PCT/EP2022/084086, filed Dec. 1, 2022, the entire contents of which are incorporated herein by reference.

TECHNICAL FIELD

The invention relates to an automated method for predicting the compatibility of assemblies, or modules, for a functional unit of a field device of automation technology.

BACKGROUND

In automated plants, especially in process- and factory automated plants, field devices are often applied, which serve for registering and/or influencing process variables. For registering process variables of a gaseous, liquid or solid medium, sensors are used, which are integrated in, for example, fill level measuring devices, flowmeters, pressure- and temperature measuring devices, pH-redox potential measuring devices, conductivity measuring devices, spectrometers, etc., which register the corresponding process variables, fill level, flow, pressure, temperature, pH value, conductivity, and chemical composition of the medium. Serving for influencing process variables are actuators, such as, for example, valves or pumps, via which the flow of a liquid in a pipeline section, or the fill level in a container, can be changed. Referred to as field devices are, in principle, all devices, which are applied near to a process and which deliver, or process, process relevant information. In connection with the invention, the terminology, field devices, thus, refers also to remote I/Os, radio adapters, and, in general, devices, which are arranged in an automated plant. A large number of such field devices are manufactured and sold by the firm, Endress+Hauser.

For producing an electrical, electronic or mechatronic functional unit of a field device, it is necessary to combine a large number of different assemblies with one another. For example, each field device has at least one transmitter electronics and one sensor electronics, wherein both the transmitter electronics and also the sensor electronics are composed, in turn, of a plurality of largely different, electrical and/or electronic components and/or assemblies.

In the context of manufacture of an assembly or a functional unit, it is e.g. necessary to have available reliable information concerning very many properties and physical (quality-) parameters of individual electrical components on the circuit board. In order to attain the corresponding knowledge, the properties of the electrical components are measured. Besides the measurement of the properties of the individual components of the electrical assembly, also properties of the electrical assembly as a whole are measured. These measurements comprise, for example, measuring capacitances, inductances, system responses to external stimulation, e.g. pressure loading and/or temperature loading, signal/noise ratios, etc. Moreover, the sensor electronics are tested, wherein the testing occurs as a function of the character and function of the sensor electronics, e.g. a basic capacitance testing is performed in the case of a capacitive pressure sensor. Likewise, the tests concern the entire sensor assembly of the field device, which can include the sensor electronics. Usual methods in such case are, e.g., compensation, verification and/or calibration of the sensor assembly.

In order to be able to assure a unique associating of the measured values with the components or the electrical assemblies, the measured values, and likewise the collected empirical values, are usually associated with unique identification numbers of the components electrical assemblies. Usually, the unique identification number is the serial number of the component or electrical assembly. The data are stored in a database.

In order to find a suitable pairing of at least two, for example electrical, assemblies, usually a trial/error method is applied: Two assemblies are brought together and then testing performed to determine whether the combination fulfills the desired specification. This method is continued until a suitable combination of electrical assemblies is found. This method is disadvantageous, among reasons, in that is it, on the one hand, very time consuming and therewith also costly, and in that, on the other hand, it cannot be assured that an even better combination of electrical assemblies exists than the one found.

The uncertainty, whether two components are compatible with one another, can lead to the fact that in some cases the incompatibility of electrical assemblies is accepted. Such leads usually to rework in the form of repairs and/or increased reject costs.

Alternatively, rule based systems are applied for finding compatible electrical assemblies. These rule based systems make use of component tolerances, in order to define suitable pairings. Rule based systems can only be used with acceptable effort in the case of a small number of physical parameters to be reconciled with one another, such as properties, measures, measured values, dimensions, etc. As soon as the mechanisms are, due to a large number of properties/dimensions, no longer modelable, thus traceable, using simple, so-to-say humanly defined, rules, this approach fails.

SUMMARY

An object of the invention is to provide a method for finding pairings of compatible assemblies that are with high probability combinable for a functional unit with a defined specification.

The object is achieved by an automated method for predicting compatibility of assemblies for an electrical, electronic or mechatronic functional unit of a field device of automation technology, wherein the functional unit is composed of at least a first electrical or electronic or mechanical assembly and at least a second electrical or electronic assembly, wherein the functional unit is defined by a plurality of functional parameters and wherein at least some of the functional parameters have a predetermined specification as a function of a particular application of the functional unit and/or of the field device, and, thus, lie within a predetermined value range, wherein the method comprises method steps as follows:

- identifying first assemblies, which fulfill a first function within the functional unit, wherein each of the first assemblies has a plurality of first physical parameters, wherein the first physical parameters of the first assembly differ as regards their positions within predetermined first tolerance bands;

identifying second assemblies, which perform a second function within the functional unit, wherein each of the second assemblies has a plurality of second physical parameters, wherein the second parameters of the second assembly differ as regards their positions within predetermined second tolerance bands;

using stored data, which rest on measured values and/or empirical values for the first parameters of the first assemblies and for the second parameters of the second assemblies and/or for subcomponents of the first or the second assembly and/or for parameters of different combinations of first assemblies and second assemblies, selecting at least one combination of a first assembly and a second assembly, which fulfills the predetermined specifications of the functional parameters of the functional unit with a high probability.

Since the method of the invention automatically generates a proposal for the possible pairings, thus combinations, of at least two assemblies for creating the desired functional unit of the field device, the lengthy trial/error process so far applied is no longer needed. The method of the invention also provides an increased certainty that a proposed combination of two assemblies fulfills the desired specification of the functional unit—at least with a high probability. This leads to considerable time- and cost savings in the context of production of a field device.

Examples for the pairing of concrete mechanical, electrical or electronic assemblies used in field devices are listed as follows: the mechanical, oscillatory rod of a vibronic single rod measuring device, e.g. a Soliphant measuring device, and an electromechanical piezo drive, thus, a mechanical assembly and an electronic assembly, lead to a mechatronic assembly; the sensor electronics of a fill level radar device and the main electronics of the fill level radar device, thus two electrical and/or electronic assemblies; different circuit boards as components of a main electronics in case of a gamma detector, which were all tested in the preproduction as lying within the specification, which in combination, however, lie outside of the specification—and, indeed, with a certain probability. This stems from the fact that the assemblies within the tolerances predetermined by the specification lie so unfavorably that the pairings lie outside of the specification.

Especially advantageous is that the method works with computer support, wherein especially methods of artificial intelligence are applied. Central component of the method is e.g. a self-learning expert system. This expert system utilizes the methods of artificial intelligence, in order to analyze data and information relative to available electrical/electronic components, assemblies and functional units, to perform diagnoses based on the collected data and information, and, based on the analyses and diagnoses, to suggest to a user the assemblies optimally suitable for the particular functional unit.

Used as machine-learning-, or prognosis, system can be a neural network. Of course, in principle, any type of known machine-learning algorithms, or prognosis algorithms can be used, e.g. Bayes-classifier algorithms, linear-regression algorithms, random forest algorithms, etc.

Advantageously in connection with the present invention, data from preceding or current manufacturing processes of first assemblies, second assemblies and/or functional units are used as measured values and/or empirical values. The measured values and/or empirical values are preferably stored in association with unique identification numbers of the first assemblies, second assemblies and functional units.

Moreover, it is provided that first assemblies and second assemblies, which lie outside of predetermined tolerance bands, are omitted.

Furthermore, first assemblies and second assemblies, whose combinations lie outside of the specification of the functional unit, are omitted. They are no longer taken into consideration.

In an interesting embodiment of the method of the invention, it is provided that for each checked combination, based on degree of agreement of the physical parameters and/or based on degree of fulfillment of the specifications of the physical parameters of the functional unit, a value is determined for probability, wherein the value for the probability is a measure for the degree of compatibility between a first assembly and a second assembly such that a defined functional unit fulfills the required specification.

Especially, it is provided that the machine-learning-, or prognosis, system, calculates for each prognosed combination of at least two assemblies an index, which is a measure for the probability of the desired ability of the two combined assemblies to function. An absolute statement whether a combination meets a desired specification can also be difficult to obtain from a machine-learning-, or prognosis system, such as a neural network. By means of the index, however, it can be estimated, how high the probability is. It can, for example, be provided to output an index with a value between 0 and 1. The greater the index, the greater is the probability. It can, additionally, be provided that the machine-learning-, or prognosis, system has two outputs and performs an internal classification of the found combinations of assemblies on the basis of the index. Thus, it can be provided that output on the first output (positive result) are those combinations, whose index is greater than, or greater than or equal to, a predetermined value, for example, 0.5. In contrast, output on the second output (negative result) are those combinations, whose index is less than 0.5.

For the purpose of optimizing the method, preferably a combination of assemblies is proposed for producing the functional unit—and, indeed, that, which achieves the greatest degree of compatibility as regards the ability of the functional unit to function.

Moreover, it is provided that all checked combinations of first assemblies and second assemblies and their degree of compatibility are made available in an ordered list-thus, as a ranking.

BRIEF DESCRIPTION OF THE DRAWINGS

The present disclosure will now be explained in greater detail based on the appended drawing, the figures of which show as follows.

DETAILED DESCRIPTION

Figures 1, 1A:
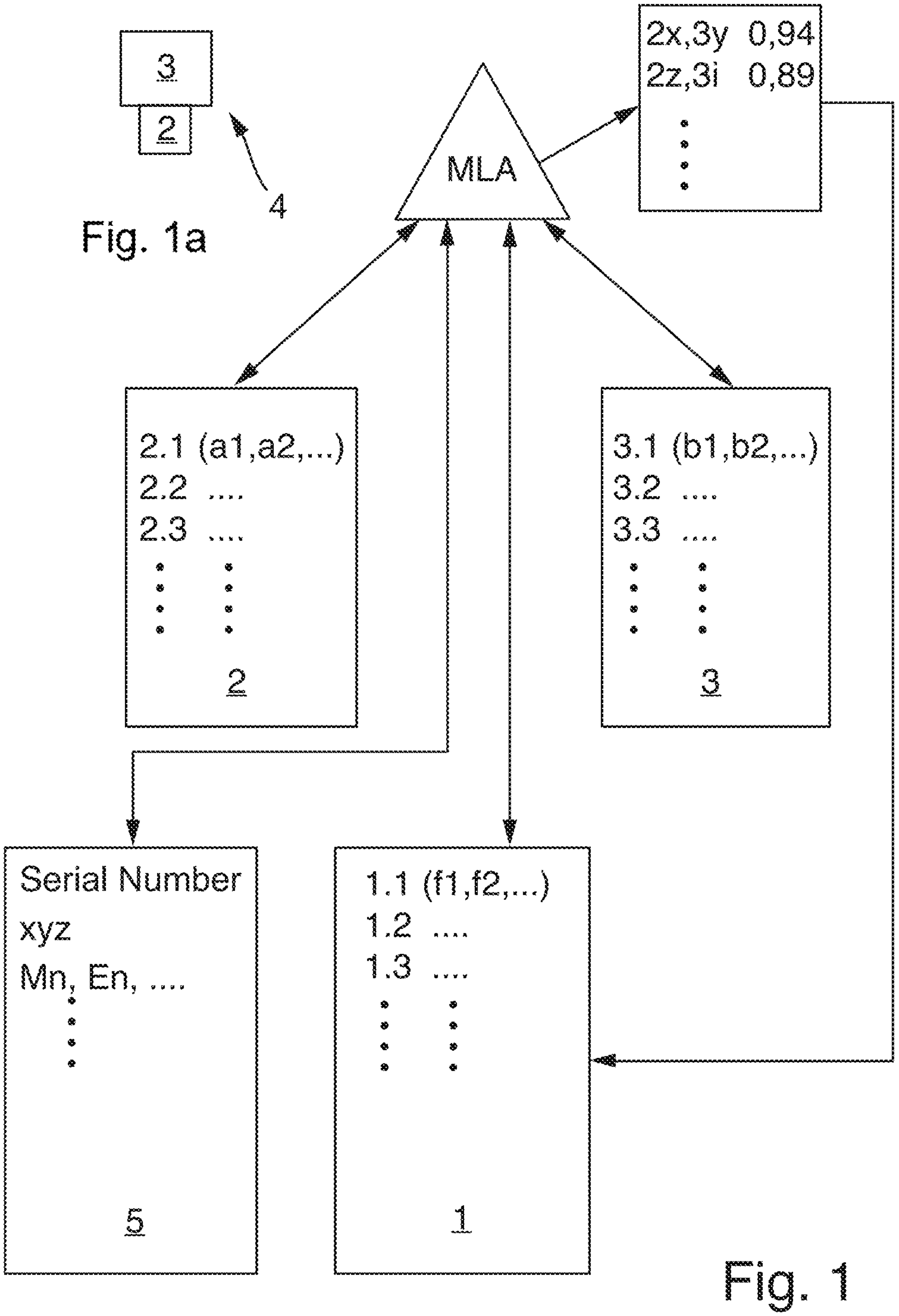
FIG. 1 shows a schematic view illustrating the way in which an embodiment of the method of the present disclosure works.
FIG. 1*a* shows a schematic view of a field device of automation technology.

The invention provides an automated method for predicting the compatibility of mechanical, electrical and/or electronic assemblies 2, 3 for producing a functional unit 1 of a field device 4, thus also for a field device 4 of automation technology. The functional unit 1 is composed of a first assembly 2 and at least a second assembly 3. The functional unit 1 can be described by a plurality of functional parameters f1, f2, f3, . . . . At least some of the functional parameters f1, f2, f3, . . . have a predetermined specification, i.e. lie within a predetermined value range, as a function of the particular application of the functional unit 1 and/or field device 4.

In general, an embodiment of the method of the invention can be described by method steps as follows: In a first step, first assemblies 2 are identified, which fulfill a first function within the functional unit 1, wherein each of the first assemblies 2 has a plurality of first physical parameters a1, a2, a3 . . . . The physical parameters a1, a2, a3, . . . of the first assembly 2 differ as regards their positions within a predetermined first tolerance band. Furthermore, second assemblies 3 are identified, which perform a second function within the functional unit 1, wherein each of the second assemblies 3 has a plurality of second physical parameters b1, b2, r3, . . . . Also the second parameters b1, b2, r3, . . . of the second assembly 2 can differ as regards their position within a predetermined, second tolerance band.

Then, using stored data at least one combination of first assembly 2 and second assembly 3 is selected, which fulfills the predetermined specifications of the functional parameters f1, f2, f3, . . . of the functional unit 1 with a high probability.

The data are, for example: measured values Mn, n=1 . . . y, and empirical values En, n=1 . . . x for the first parameters a1, a2, a3, . . . of the first assemblies 2 and for the second parameters b1, b2, r3, . . . of the second assemblies 3, and/or for subcomponents of the first or the second assembly 2, 3, and/or for the parameters ab1, ab2, ab3, . . . of the different combinations of first assemblies 2 and second assemblies 3.

In an example of finding a suitable pairing of a first assembly 2 and a second assembly 3, the first assembly 2 is a transmitter electronics, and the second assembly 3 is a sensor electronics. The combination of the two leads to a field device 4 of automation technology (FIG. 1*a*). Examples of such field devices 4 are given in the introduction of the description and incorporated by reference here.

In the electronics production, very many properties of individual components mounted on a circuit board, as well as properties of the total electronic assembly 3 mounted on the circuit board, are measured. The measured values Mn are stored in a database 5 per serial number of assembly 3.

Similar considerations hold for a sensor assembly. Along the production chain, a wide variety of measured values Mn of properties of individual components or the sensor assembly are registered. For example, in case of a capacitive pressure sensor, a basic capacitance testing is performed on the sensor. Measurements are also performed on the sensor assembly, which comprises sensor (=first assembly 2) and sensor electronics (=second assembly 3). Mentioned here in such case are, especially the compensation, the verification or the calibration of the sensor assembly (=functional unit 1).

In general, the measurings of physical parameters, which form the measurement data Mn, comprise measuring resistances, inductances, capacitances, system responses to external stimulation, e.g. pressure loading and/or temperature loading, signal/noise ratios—to name only a few examples.

The job of the machine-learning algorithm MLA is to evaluate and/or to analyze the stored measured values Mn and/or empirical values En as regards the physical parameters of the individual first assemblies 2, e.g. of sensor assemblies for pressure measuring devices, and the second assemblies 3, e.g. evaluator assemblies for pressure measuring devices, in such a manner that as result at least one pairing of first and second assemblies 2, 3 is output, which leads with high or highest probability to a functional unit 1, e.g. to a field device 4, which fulfills the specifications required in the particular application.

Based on a plurality of measured values Mn and empirical values En originating from earlier test series or observations, by means of artificial intelligence, such pairings are targetedly predicted, which are with high probability compatible with one another and, thus, lead to a specification true, functional unit 1, e.g. a specification true, field device 4.

Ideally, there occurs a classification of all possible combinations of assemblies 2, 3, which lead to a suitable functional unit 1. For this, for each combination, a probability is output for mapping the degree of compatibility of two assemblies 2, 3 into a continuous variable. Based on such data, a compatibility ranking of all possibilities of combination of all currently possible pairings of assemblies 2, 3 can be created. In such case, it does not matter, whether the analyzed combinations of assemblies 2, 3 concern assemblies 2, 3, which are already in the warehouse or still located in the production line.

Then, this list with a wide variety of possibilities of combination of assemblies 2, 3 can be so processed by the machine-learning algorithm MLA that especially the assemblies 2, 3, for which few or no suitable partners results, thus, the less compatible assemblies 2, 3, are first worked off, or sorted out. In a further development, assemblies 2, 3, which are especially difficultly or especially easily combinable, can remain longer in the queue, in order, in given cases, to be combined with assemblies 2, 3 coming later into the warehouse.

Finally, it is provided that the pairing of assemblies 2*x*, 3*y* found to be ideal/suitable is transferred through declaration of the corresponding serial numbers by the machine-learning system MLS directly to the production line. For the transfer, parts lists, for example, are utilized—e.g. using bills of materials—or special mechanisms, such as "pick by light".

As starting point for finding compatible pairings of assemblies 2, 3, a user can specify at least one, however, typically many, physical start parameter(s), which should be measured/checked for each component type as "quality parameter(s)", such as e.g. the signal/noise ratio, temperature coefficient, roughness, stiffness or capacitance. Other quality parameters can—in case necessary—also be checked.

The method of the invention is grounded in a database 5 in which all measurement data Mn and empirical values En are stored under the serial number of each assembly 2, 3 or functional unit 1 of interest. The data of the database 5 is continuously expanded, supplemented and, in given cases, corrected.

Stored is information concerning functional properties/qualities of each individual assembly 2, 3 or functional unit. The data Mn, En are won, for example, during production of the assembles 2, 3 and functional units 1. Corresponding information is usually known from older productions of assemblies 2, 3 and functional units 1. Information concerning compatibility of different variants of assemblies 2, 3 for functional units 1 are likewise present.

The various assemblies considered for creating a functional unit having a predetermined specification are virtually "mounted" by the machine-learning algorithm MLA. Based on information concerning compatibility of different assemblies 2, 3—collected e.g. in a test plant-predictions can be made regarding the compatibility of modified or new assemblies 2, 3. Based on a model, an AI (Artificial Intelligence) determines the combination, or at least one combination, of assemblies 2, 3, which fulfills the predetermined specification. Preferably the model is so trained that it selects those combinations of two assemblies 2, 3, which fulfill the predetermined specification with the highest probability.

The mechanical or electrical, or electronic, assemblies 2, 3 can come from all levels of component types, e.g. chips, circuit boards, sensors, mechanical components, such as antennas, plugs, actuators. In general in connection with the invention, the terminology, an assembly 2, 3, means anything, which can itself fulfill a function.

An advantage of the invention, is—such as indicated—that no time needs to be lost testing and measuring parameters of unsuitable combinations of assemblies 2, 3. With targeting, combinations can be selected, which fulfill the desired specification. Preferably, the optimizing algorithm of the AI—especially the machine-learning algorithm'—ascertains for each type of possibly suitable assemblies 2, 3 a quality factor ("degree of compatibility") and generates based on the quality factors a prediction on which of the possible, suitable combinations is the optimum one.

The invention claimed is:

1. An automated method for predicting compatibility of assemblies for an electrical, electronic or mechatronic functional unit of a field device of automation technology, wherein the functional unit is composed of at least a first electrical or electronic or mechanical assembly and at least a second electrical or electronic assembly, wherein the functional unit is defined by a plurality of functional parameters and wherein at least some of the functional parameters have a predetermined specification as a function of a particular application of the functional unit and/or of the field device, and, thus, lie within a predetermined value range, wherein the method comprises method steps as follows:

identifying first assemblies, which fulfill a first function within the functional unit, wherein each of the first assemblies has a plurality of first physical parameters, wherein the first physical parameters of the first assembly differ as regards their positions within predetermined first tolerance bands;

identifying second assemblies, which perform a second function within the functional unit, wherein each of the second assemblies has a plurality of second physical parameters, wherein the second parameters of the second assembly differ as regards their positions within predetermined second tolerance bands;

using stored data, which rest on measured values or empirical values for the first parameters of the first assemblies and for the second parameters of the second assemblies or for subcomponents of the first or the second assembly or for parameters of different combinations of first assemblies and second assemblies, selecting at least one combination of a first assembly and a second assembly, which fulfills the predetermined specifications of the functional parameters of the functional unit with a high probability.

2. The method as claimed in claim 1, wherein the method works with computer support, wherein methods of artificial intelligence are applied.

3. The method as claimed in claim 1, wherein data from preceding or current manufacturing or test processes of first assemblies, second assemblies or functional units are used as measured values or empirical values, wherein the measured values or empirical values are stored with unique identification numbers, wherein each identification number unequivocally designates a particular first assembly or second assembly or functional unit.

4. The method as claimed in claim 1, wherein first assemblies and second assemblies, which lie outside of predetermined tolerance bands, are omitted.

5. The method as claimed in claim 1, wherein first assembly and second assembly, whose combination lies outside of the specification of the functional unit, are omitted.

6. The method as claimed in claim 1, wherein for each checked combination of first assembly and second assembly, based on degree of the position in the tolerance band or based on degree of fulfillment of the specifications of the physical parameters of the functional unit, a value is determined for probability, wherein the value for the probability is a measure for the degree of compatibility between a first assembly and a second assembly such that a functional unit combined from the assemblies fulfills the required specification.

7. The method as claimed in claim 6, wherein at least one combination of selected first assembly and selected second assembly is proposed for producing the functional unit, wherein the selected combination preferably achieves the highest degree of compatibility.

8. Method as claimed in claim 6, wherein all checked combinations of first assemblies and second assemblies and their degree of compatibility are made available in an ordered list as a ranking.

* * * * *